United States Patent
Shen et al.

(10) Patent No.: US 9,684,649 B2
(45) Date of Patent: Jun. 20, 2017

(54) METHOD AND SYSTEM FOR DISCOVERING SUSPICIOUS ACCOUNT GROUPS

(71) Applicant: INDUSTRIAL TECHNOLOGY RESEARCH INSTITUTE, Hsinchu (TW)

(72) Inventors: Min-Hsin Shen, Taichung (TW); Ching-Hsien Li, Kaohsiung (TW); Chung-Jen Chiu, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 730 days.

(21) Appl. No.: 13/729,681

(22) Filed: Dec. 28, 2012

(65) Prior Publication Data

US 2014/0058723 A1 Feb. 27, 2014

(30) Foreign Application Priority Data

Aug. 21, 2012 (TW) .............................. 101130272 A

(51) Int. Cl.
*G06F 17/27* (2006.01)
(52) U.S. Cl.
CPC ...... *G06F 17/2785* (2013.01); *G06F 17/2765* (2013.01); *G06F 17/2795* (2013.01)
(58) Field of Classification Search
CPC ............ G06Q 20/4016; G06F 17/2765; G06F 17/277; G06F 17/2785; G06F 17/2795; G06F 17/30011
See application file for complete search history.

(56) References Cited

U.S. PATENT DOCUMENTS 5,835,893 A * 11/1998 Ushioda .................. G10L 15/18
704/10
6,104,989 A * 8/2000 Kanevsky ........... G06F 17/2715
704/257

(Continued)

FOREIGN PATENT DOCUMENTS

CN 101924660 A 12/2010
TW 201029425 A1 8/2010

OTHER PUBLICATIONS

Al-Zaidy et al., "Towards Discovering Criminal Communities from Textual Data", ACM SAC, pp. 1-6, 2011.*

(Continued)

*Primary Examiner* — Angela A Armstrong
(74) *Attorney, Agent, or Firm* — Birch, Stewart, Kolasch & Birch, LLP

(57) ABSTRACT

In one exemplary embodiment, a system for discovering suspicious account groups establishes a language model according to the post contents from each account of a first group of accounts during a first time interval, to describe the speech of the account, and compares the similarity among a plurality of language models of the first group of accounts to cluster the first group of accounts; and for a plurality of newly added data during a second time interval, discovers near-synonyms of at least a monitored vocabulary set, and updates the near-synonyms to a plurality of language models of a second group of accounts. The system further integrates the first and the second groups of accounts, and re-clusters an integrated group of accounts.

17 Claims, 9 Drawing Sheets

(56) References Cited

U.S. PATENT DOCUMENTS

| | | | |
|---|---|---|---|
| 6,199,034 B1 | 3/2001 | Wical | |
| 6,484,136 B1* | 11/2002 | Kanevsky | G06F 17/2765 704/255 |
| 7,400,245 B1 | 7/2008 | Johnson | |
| 7,698,335 B1* | 4/2010 | Vronay | G06F 17/30038 707/737 |
| 7,860,222 B1 | 12/2010 | Sidler et al. | |
| 8,001,136 B1 | 8/2011 | Papachristou et al. | |
| 8,510,098 B2* | 8/2013 | Spears | G06F 17/28 704/1 |
| 9,112,972 B2* | 8/2015 | Bushey | H04M 3/5166 |
| 2007/0083374 A1* | 4/2007 | Bates | G10L 15/197 704/257 |
| 2007/0244697 A1 | 10/2007 | Bushey et al. | |
| 2008/0133552 A1 | 6/2008 | Leary | |
| 2008/0189789 A1 | 8/2008 | Lamontagne | |
| 2009/0300589 A1 | 12/2009 | Watters et al. | |
| 2011/0201317 A1* | 8/2011 | Karandikar | G06Q 30/02 455/414.1 |
| 2014/0067368 A1* | 3/2014 | Yih | G06F 17/30672 704/9 |

OTHER PUBLICATIONS

Wang et al., "Using Social Contextual Information to Match Criminal Identities". Proceedings of the 39th Hawaii International Conference on System SCiences, pp. 1-9, 2006.

Fung et al., "Towards Discovering Criminal Communities from Textual Data", ACM SAC, pp. 1-6, 2011.

Houvardas et al., "N-Gram Feature Selection for Authorship Identification". AIMSA, pp. 77-86, 2006.

Sun et al., "Variable Length Character N-Gram Approach for Online Writeprint Identification", 2010 International Conference on Multimedia Information Networking and Security, pp. 486-490, 2010.

Escalante et al., "Local Histograms of Character N-grams for Authorship Attribution", Pmceedings oftlu! 49th Annual Meeting of the Association for Computational Linguistics, pp. 288-298, Jun. 19-24, 2011.

Hsu et al., "Applying Topic Maps Theory to Construct Knowledge Indexes on Event-Based On-Line News Retrieval Reasarch", Institute of Information Management National Yunlin University of Science & Technology, Jul. 2005, Figs 4, 11; formula 3, 5, verse 2.3, verse 3.2, lines 14-20, verse 3.3, lines 1-5, verse 3.3.3, verse 3.3.4, verse 5.2, lines 24-40.

Cheng, "Corpus-Based Coherence Relation Tagging in Chinese Discourse", 2005, The DBLP Computer Science Biliography, http://www.informatik.uni-trier.de/~ley/pers/hd/c/Cheng:Shoou=Yi.html, verse 1, lines 18-40, verse 2, lines 1-5, verse 3.

Taiwan Patent Office, Office Action, Patent Application Serial No. TW101130272, Jul. 15, 2014, Taiwan.

China Patent Office, Office Action, Patent Application Serial No. CN201210379865.4, Apr. 5, 2016, China.

Al-Zaidyet al., Towards Discovering Criminal Communities From Textual Data, SAC'11 Proceedings of the 2011 ACM Symposium on Applied Computing, pp. 172-177, Mar. 25, 2011.

Yin et al., Analysis of Internet Tracking and Discovery, pp. 4-7, Jan. 7, 2012.

* cited by examiner

Monitored Vocabulary: doing-aid, moonlighting, assistance, compensated dating, part-time Account A
Ann I called Cher pure water school girl initial part-time! 20 years old Height 162
Weight 46 measurements 33c.23.34 in the face of reality. dreams as the sky of the stars. expected to be that. it takes courage to make some decisions. takes time. consideration also needs to see someone paste reserves in network. part-time. I also tried to find a brief interlude in the net sea.

Account B
Posting content: Hello my lovely nini school girl moonlighting eat fish coming
http://www.wretch.cc/blog/a1984nini leave message to me

FIG. 3 sisshirley 0 Ann I am Cher pure water school girl initial part-time!
20-year-old Height
162 weight 46 measurements 33c.23.34 in the face of reality.
dreams as the sky of the stars. expected to be that. it takes courage
to make some decisions. takes time. consideration also needs to see
someone paste reserves in network. part-time. I also tried to find a
brief interlude in the net sea. hope you forget all trouble and
sorrow. sweet and sexy Cher make you heart it? you and me start
from this second. There is need of brother add me MSN:
annann@hotmail.com  do not bother with no sincere, leave phone
on the album.
I will contact with you in time
Lovesofar.36 / real account sisshirley: Ann I called Cher pure water
school girl
Initial part-time! 20 years old Height 162 Weight 46 measurements
33c 23 34 I tried to to find a brief interlude in the net sea. hope you
forget all trouble and sorrow. sweet and sexy Cher make you heart
it? you and me start from this second. unique album:
http:photopchomecomtwwsllndo There is need of brother add me
MSN:

FIG. 4

Window T: brother Ann I am Wei 34d / 6k compensated dating please contact 0910220021
keyword pattern: Ann Wei 34d / 6k compensated dating please contact 0910220021

Window C: Hello I am lovely nini student part-time eat fish come to http://www.wretch.cc/blog/a1984nini leave message to me
keyword pattern: Hello lovely nini student part-time eat fish come to http://www.wretch.cc/blog/a1984nini leave message

FIG. 5

METHOD AND SYSTEM FOR DISCOVERING SUSPICIOUS ACCOUNT GROUPS

CROSS-REFERENCE TO RELATED APPLICATION

The present application is based on, and claims priority from, Taiwan Patent Application No. 101130272, filed Aug. 21, 2012, the disclosure of which is hereby incorporated by reference herein in its entirety.

TECHNICAL FIELD

The present disclosure relates generally to a method and system for discovering suspicious account groups.

BACKGROUND

The popularity of social networking leads to a lot of network crimes, such as the behaviors of spreading pornography message or performing network deception in the network by using multiple accounts. Internet users may change account and post content, or gradually change used keyword terminology to circumvent tracking down. These network criminal behaviors may leave traces in all kinds of social networks.

In the existed tracking down technologies, for example, the police network reconnaissance system makes clear the features of account groups before carrying communications analysis. In the system domain of crime information systems, related interactions are identified between accounts according to the common synonym of the features of two words. For example, the system may retrieve the longest common substring between two words, to calculate a ratio of the length of this common substring to the larger length of words in these two words in order to confirm whether the ratio is greater than a first threshold value; and checks if the calculated edit-distance of these two words is greater than a second threshold value. When the above two conditions are sustained, it is determined that these two words are synonymous.

FIG. 1 shows a schematic view illustrating a context processing system for deciding theme of sentence. The system comprises a theme vector processor 110 that decides the theme of an input sentence 112. This technology is firstly analyzing speech for each word in the input sentence 112, and then using an ontology to analyze the sentence, including identifying semantics of each word to form a semantic theme vector, and comparing the semantic theme vector of this sentence with the semantic theme vector of a training corpus 120, to determine the theme and the class of this sentence.

There is a technology for monitoring and analyzing crime-related information that uses a scheme of event identifier or word search to mark crime-related information sections concerned by the police, to remind investigators to monitor the original voice data of the sections. The event identifier such as a bookmark of event concerned by polices, contains keywords of the concerned event and the voice data of one or more specific persons.

There is a technology for structuring a dataset, which performs clustering based on the personal information provided by users, and uses a series of pre-defined question databases to identify communication-recorded groups with suspicious fraud behaviors. Wherein the structured attribute information of the users used for a basis of clustering may include such as name, phone number, or address, etc. A network crime investigation technology is that, when the Internet user is on-line, the source identification code of an online device performs matching simultaneously in the criminal investigation web site with the telephone number and authorization code of the user's on-line device to verify a true identity of the user.

Another technology for searching multiple identities of criminals is using individual basic feature data, such as name, gender, height, weight, etc., to match multiple identities, and then match the multiple identities of criminal according to an individual role in the crime database and links the relationship among the multiple identities. Yet there is a technology for detecting crime groups through the person's name identification and the related-rules analysis from the documents to identify names group (accomplice) of frequent and co-occurrence.

The technologies for discovering and detecting multiple identifications include the techniques on authorship identification, online writeprint identification, authorship attribution identification, etc. Among them, a technology for authorship identification uses the N-gram features in personal writing text to match multiple identities; a technology for authorship attribution identification matches multiple identities through the N-gram features of variable lengths. A technology for authorship identity adjusts the N-gram feature weights to match multiple identities through local histograms.

In the network of nowadays and future, a technology for discovering suspicious account group needs to have language model adaptation functions with one or more near-synonyms, to analyze the language-fashion similarity of the post contents of accounts, and then discover suspicious the account group with a high speech homogeneity. And after discovering the group of accounts, this technology may also couples with communications analytical technique, to view the interaction connection between accounts. Such technology for discovering suspicious account groups is issues to be explored.

SUMMARY

The exemplary embodiments of the disclosure may provide a method and system for discovering suspicious account groups.

One exemplary embodiment relates to a method for discovering suspicious account groups. The method comprises: under a control of at least one hardware processor, establishing a language model according to one or more post contents from each account of a first group of accounts during a first time interval, to describe a linguistic fashion of the account, and comparing a similarity among a first group of language models of the first group of accounts to cluster the first group of accounts; and for a plurality of newly added data during a second time interval, discovering one or more near-synonyms of at least one monitored vocabulary set, and updating the one or more near-synonyms to a second group of language models of a second group of accounts, further integrating the first and the second groups of accounts, and re-clustering an integrated group of accounts.

Another exemplary embodiment relates to a system for discovering suspicious account groups. The system comprises a language model training device, an account clustering device, a near-synonym identification device, and an incremental account clustering device. The language model training device establishes a language model according to one or more post contents from each account of a first group of accounts during a first time interval, to describe a linguistic fashion of the account. The account clustering device clusters the first group of accounts according to a similarity of a first group of language models of the first group of accounts. The near-synonym identification device discovers one or more near-synonyms of at least one monitored vocabulary set for a plurality of newly added data during a second time interval, and updates the one or more near-synonyms to a second group of language models of a second group of accounts. The incremental account clustering device integrates the first and the second groups of accounts, and re-clusters an integrated group of accounts.

BRIEF DESCRIPTION OF THE DRAWINGS

FIG. 3 shows a schematic view of downloading a group of accounts from the monitoring site, and the post content corresponding to each account, according to an exemplary embodiment.

FIG. 4 shows an exemplary post text of an account group, according to an exemplary embodiment.

FIG. 5 shows a schematic view of capturing the keyword pattern from a target window and a candidate window, according to an exemplary embodiment.

DETAILED DESCRIPTION OF DISCLOSED EMBODIMENTS

Figure 1:
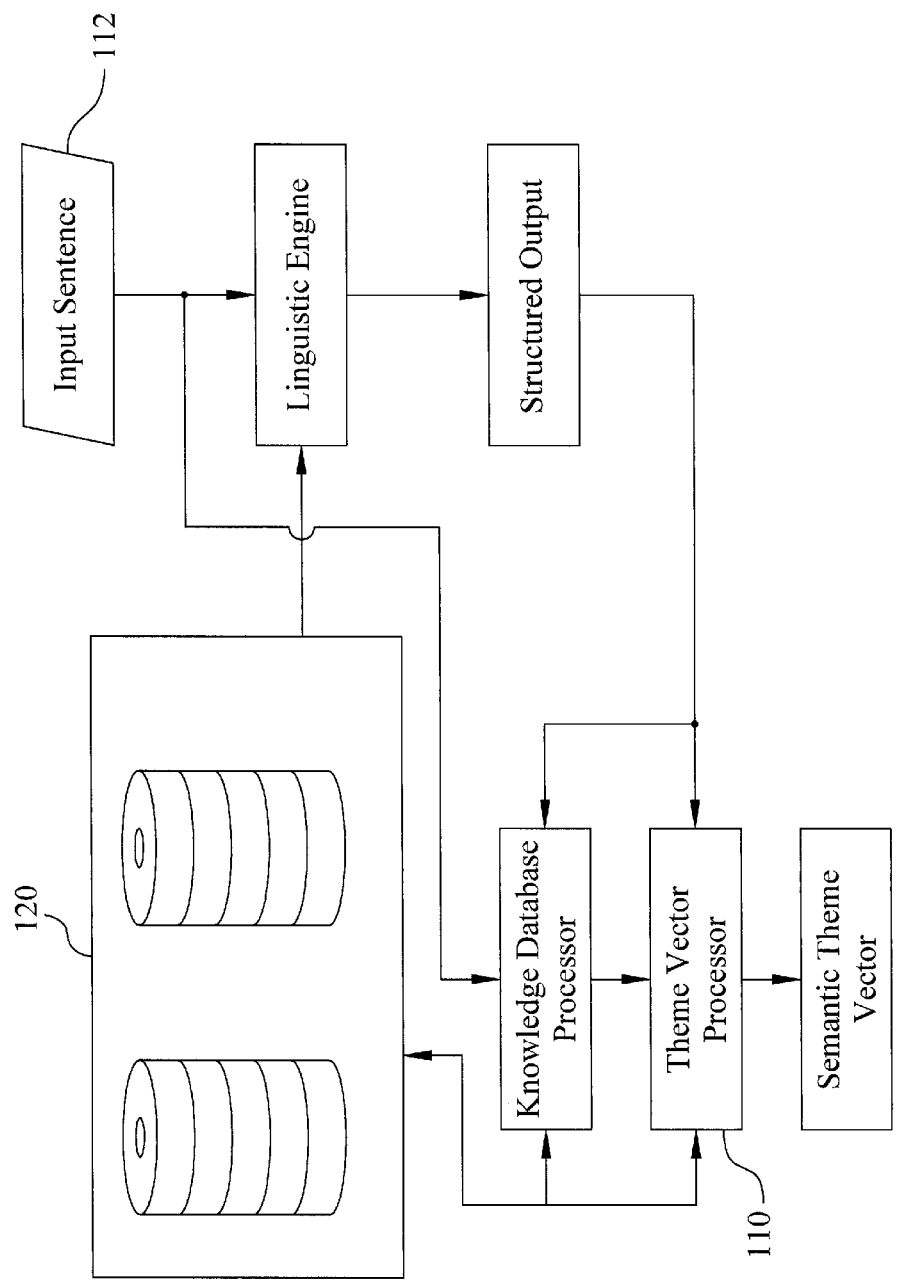
FIG. 1 shows a schematic view of a text processing system for deciding theme of sentence.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiment discover suspicious group of accounts in information transmission and communication media such as social networks. The exemplary embodiments provide a language model adaptation technique with near-synonym, to be able to analyze the similarity of the linguistic fashion for describing post contents of accounts. This technique is based on the post contents of each account of a group of accounts during a time interval, establishes a language model of the account to describe the linguistic fashion of the account, to cluster the group of accounts; and for a plurality of newly added data during another time interval, discovers near-synonyms of at least one monitored vocabulary set to determine feature of the near-synonyms and their importance, and updates the language model for each account of the another group of accounts during the another time interval, and further updates the result of the groups of accounts.

Figure 2:
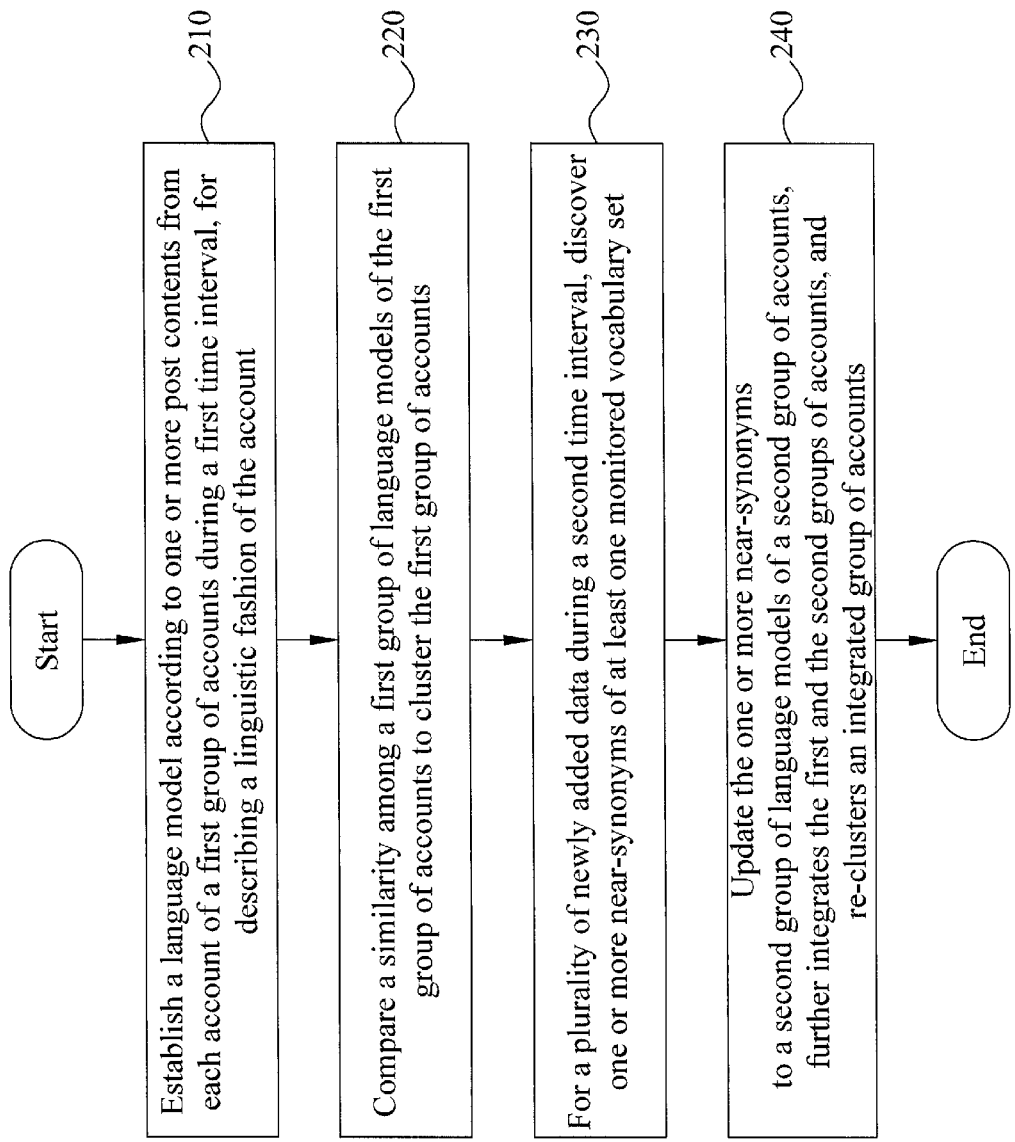
FIG. 2 shows a method for discovering suspicious group of accounts, according to an exemplary embodiment.

Accordingly, FIG. 2 shows a method for discovering suspicious group of accounts, according to an exemplary embodiment. Refer to FIG. 2, this method may be under a control of at least one hardware processor, to establish a language model according to one or more post contents from each account of a first group of accounts during a first time interval, for describing a linguistic fashion of the account (step 210), and compare a similarity among a first group of language models of the first group of accounts to cluster the first group of accounts (step 220). And, for a plurality of newly added data during a second time interval, the method discovers one or more near-synonyms of at least one monitored vocabulary set (step 230), and updates the one or more near-synonyms to a second group of language models of a second group of accounts, further integrates the first and the second groups of accounts, and re-clusters an integrated group of accounts (step 240).

For each of updated time intervals, this method repeats the preceding step 230 to step 240 to continuously discover one or more suspicious groups of accounts. In other words, for a plurality of newly added data during each time interval, this method discovers one or more near-synonyms of at least a monitored vocabulary set, and updates the one or more near-synonyms to a plurality of language models of another group of accounts, and further integrates different groups of accounts to re-cluster the group of accounts, in order to continuously discover the suspicious groups of accounts.

Accordingly, in step 220, for each account of the first group of accounts, this method may calculate and compare the similarity of a plurality of language models corresponding to the first group of accounts, and clusters the first group of accounts according to the comparison result of the similarity. In step 230, this method downloads a plurality of new data from one or more monitoring sites during the first time interval, discovers near-synonyms of at least one monitored vocabulary set from the new added data. For each of updated time intervals, this method updates the near-synonyms to existed language models, and for each new account of group of accounts different from a previous group of accounts of different groups of accounts, this method re-establishes a language model to describe its post contents of the new account. Then this method re-calculates and re-compares the similarity of the plurality of language models of the different groups of accounts, integrates the different groups of accounts and the previous group of accounts according to the re-comparison result of the similarity, and re-clusters an integrated group of accounts.

Application scenarios and details for the above steps are described below. Firstly, this method may receive a monitoring website table and a specified time interval, and obtains a monitored vocabulary set containing a plurality of words. An exemplary monitored vocabulary set may be such as a set of keywords related to pornography compensated dating, for example, doing-aid, moonlighting, assistance, compensated dating, part-time, etc. Then this method downloads all accounts and post contents corresponding to each account during the specified time interval according to the monitored vocabulary set and the specified time interval. A group of downloaded accounts (for example, including account A and account B) and corresponding post contents of each account from the monitored website may be such as shown in FIG. 3.

After obtains the corresponding post content of each account, the method established a language model corresponding to the post contents according to post contents of each account, wherein the language model may describe the linguistic fashion for the account. The post contents corresponding to each account may be such as a language model trained after text normalization processing, word segmentation processing and features retrieving on linguistic fashion. The text normalization processing is performing normalization such as to Universal Resource Locator (URL), phone, Windows Live Messenger (MSN), and e-mail for the post contents, etc. The normalization processing for the post contents is shown in an exemplar as following.

The post contents before the text normalization processing: . . . brother Ann I am Wei 34 d/6 k compensated dating please contact 0910220021 . . . .

The post contents after the text normalization processing: . . . brother Ann I am Wei 34d//6 k compensated dating please contact 0910220021 (TEL) . . . .

The word segmentation processing of the post contents, for example, may use a thesaurus long term priority word segmentation method. This word segmentation method uses a long-term priority word segmentation system to perform word segmentation processing on the initial data belonged post and the candidate stored post, respectively. For example, after performing the word segmentation processing on the post contents before the text normalization processing, the result may be as following: Brother☐Ann☐I☐am☐Wei☐34☐do/☐6☐k☐compensated dating☐please contact☐0910220021 . . . .

In an exemplar, the thesaurus long term priority word segmentation method is summarized as follows. Firstly this word segmentation method selects n characters from left to right of an input sentence, wherein n is a predetermined length, and sets a start index value of 1 and an end index value of n. Then this word segmentation method performs a thesaurus index search to the selected n characters, and the search depth is n. When a pair is found in the thesaurus indexes, this method returns these n characters, and sets the start index value to be 1+n, and the end index value to be 1+n+n. When a pair is not found in the thesaurus indexes, this method returns to a previous level, until a pair is found. When a pair is found, the star index value is set as 1+k, and the end index value of 1+k+n, wherein k represents that a match is found at the index depth k. Accordingly, the foregoing steps are repeated, until the start index value is −1, which means that all the input sentences have been processed and the process is ended at this time.

Feature retrieving on linguistic fashion means retrieving the linguistic fashion through features retrieving such as n-gram features retrieving of text belong to each account in the starting data. An exemplary post contents after performing the word segmentation processing through the n-gram feature retrieving is shown as below.
The post contents of account A: . . . Ann☐I☐called☐Ch☐er☐pure☐water☐water☐student☐girl☐initial☐part-work☐!☐ . . .
Then the post contents of account A through the n-gram features retrieving, n=5, is as follows:
Ann☐I☐called, ☐I☐called, ☐I☐called, ☐Ch, ☐called☐Ch, ☐called☐Ch, ☐er . . . .
Then the method uses the retrieved n-gram to train a language model. An exemplar of the trained language model may be expressed by the following formula.

$$P(w_1 \ldots w_m) \approx \prod_{i=1}^{m} P(w_i \mid w_{i-(n-1)}, \ldots, w_{i-1}),$$

-continued $$P(w_i \mid w_{i-(n-1)}, \ldots, w_{i-1}) = \frac{\text{count}(w_{i-(n-1)}, \ldots, w_{i-1}, w_i)}{\text{count}(w_{i-(n-1)}, \ldots, w_{i-1})}$$

Wherein, the $w_i$ represents the i-th word in the sentence, the m represents the number of word in the sentence, the count ( ) represents the number of times that a word sequence appears in the corpus, and the n indicates that the n-gram probability is statistically computed according to previous n words of the $w_i$.

After training the language model of each account, this method clusters the group of accounts according to the similarity of the language models among the accounts. This clustering is described below. Firstly, calculates a similarity of the language model of each account; then through a clustering algorithm, such as a K-means clustering algorithm, integrates a group of accounts with the similar features (high similarity) into a same group. When the similarity of a group is more than a threshold value, it is determined that the accounts in this group are a same account. The calculation method for the similarity of a language model is described below. Firstly it may convert a corresponding probability value of each element of the language model into a vector, and then obtains a similarity such as a cosine similarity, between two vectors. The following illustrates this by an exemplar.

Doc1 (cat: 0.3, dog: 0.4, tiger: 0.01) represents that in the language model of account Doc1, the corresponding probability value of the element cat is 0.3, the corresponding probability value of the element dog is 0.4, and the corresponding probability value of the element tiger is 0.01. Doc2 (cat: 0.28, dog: 0.31, tiger: 0.21) represents that in the account Doc2, the corresponding probability value of the element cat is 0.28, the corresponding probability value of the element dog is 0.31, and the corresponding probability value of the element tiger is 0.21. The account Doc1 is converted into a vector [0.3, 0.4, 0.01] to represent {cat, dog, tiger}, and the account doc2 is converted into vector [0.28, 0.31, 0.21] to represent {cat, dog, tiger}. Thus the similarity of the account doc1 and the account doc2 may be measured by such as a cosine function as follows.

$$\text{simlarity}(doc1, doc2) =$$

$$\cos(\theta) = \frac{Vdoc1 \cdot Vdoc2}{\|Vdoc1\|\|Vdoc2\|} == \frac{\sum_{i=1}^{n} Vdoc1_i \times Vdoc2_i}{\sqrt{\sum_{i=1}^{n} Vdoc1_i^2} \sqrt{\sum_{i=1}^{n} Vdoc2_i^2}}$$

After the similarity of the language model of each account in a group of accounts are calculated, it may cluster a group of accounts through a clustering method, such as the incremental clustering K-means clustering algorithm. One exemplary result of using K-means clustering may be such as {0001, 0002, 0005} and {0011, 0013, A0022}.

The exemplar of this clustering result represents that the account 0001, the account 0002 and the account 0005 are of the same group of accounts, i.e., {0001, 0002, 0005}; the account 0011, the account 0013 and the account A0022 are of the same group of accounts, i.e., {0011, 0013, A0022}. One exemplary post of a group of accounts is shown as in FIG. 4.

For a plurality of new added data during the first time interval, according to an exemplary embodiment, this method discovers near-synonyms of at least one monitored vocabulary set, and fetches one or more features through a previous and a next feature windows of each monitored vocabulary in the at least a monitored vocabulary set to determine whether one or more new words in the plurality of new added data belong to this near-synonym of the monitored vocabulary. Wherein the fetched one or more features are such as keyword pattern, or part of speech pattern (POS pattern), or concept pattern, or word string similarity, or one or more features of the aforementioned features.

According to an exemplary embodiment, the determination of the near-synonyms may further include such as establishing a target item table, establishing a word pair table, fetching feature windows, fetching key word pattern for a feature window, fetching POS pattern for the features window, retrieving concept pattern for the features window, and calculating a distance for corresponding words, and integrating all distances, etc.

Establishing a target item table means producing a target item table from the result after the words segmentation processing of a post contents. According to an exemplary embodiment, each word after the words segmentation processing of the post contents is compared with the at least a monitored vocabulary set, to find out the post containing at least one vocabulary in the monitored vocabulary set, and store this monitored vocabulary and this post into a target item table. The following describes the detailed by an exemplar. For example, the result of a post contents after the word segmentation processing of {compensated dating} is: brother Ann I am Wei 34 d/6 k compensated dating please contact 0910220021 . . . . Then, after compares each word in the post contents with each vocabulary in the monitored vocabulary set, the "compensated dating" of the above post contents is the matched word. Thus monitored "compensated dating" and the above post contents are stored into a target item table.

Establishing a word pair table means after the word segmentation processing of each post in a plurality of new added data during an updated time interval, each word in the segmented post is compared with each word in the target item table respectively, thereby producing a word pair table. An exemplar on establishing a word pair table is described below. A target item table includes a term of "compensated dating", and a result of a post contents after the word segmentation processing is: Hello I am lovely nini students part-time eat fish come to http://www.wretch.cc/blog/a1984nini leave message to me. Then the established word pair table is: (compensated dating, hello), (compensated dating, nini) . . . (compensated dating, eat fish). Wherein the left word of each word pair in the word pair table is the original monitored vocabulary, called the target word (target item), and the right word of the word pair in the word pair table is a candidate near-synonym (called the candidate item) in the result of the post contents after the word segmentation processing. Therefore, these candidate items are: Hello, nini, and eat fish. In other words, each word pair in the word pair table contains a first word and a second word. The first word is a monitored vocabulary of at least a monitored vocabulary set, while the second word is a candidate near-synonym.

Fetching feature windows means for two corresponding words of each word pair in the word pair table, i.e., the target item and the candidate item, part of the posts corresponding to the two items are respectively stored into a target window T and a candidate window C. For example, with the target item and the candidate item as the centers, previous and next n words are taken to form two feature windows, respectively, and the two feature windows are stored as the window T and the window C, respectively, wherein n is a positive integer. Take the pair (compensated dating, eat fish) as an exemplar, the detailed is described below.

Firstly considers the target item "compensated dating" of post P1: Brother Ann I am Wei 34 d/6 k compensated dating please contact 0910220021 . . . . Then the "Compensated dating" is taken as the center point, and the n words (for example, n=10) before and after the center point of post P1 are chosen to form the target window T: brother Ann I am Wei 34d/6k compensated dating please contact 091022002. Secondly considers the candidate item "each fish" of post P2: Hello I am lovely nini student part-time eat fish come to http://www.wretch.cc/blog/a1984nini leave message to me. Then the "each fish" is taken as the center point, and the n words (for example, n=10) before and after the center point of post P2 are chosen to form the candidate window C: Hello I am lovely nini student part-time eat fish come to http://www.wretch.cc/blog/a1984nini leave message to me.

After fetches feature windows of two corresponding words of each pair word in the word pair table, the method captures the keyword pattern, the POS pattern, and the concept pattern for the target window T and the candidate window C. Capturing the keyword pattern may be performed by retrieving one or more keywords from the two feature windows according to the attribute of each word in the two feature windows, such as according to the weight of each word and if the word is a stop word, and filtering out the words with weights too high or too low, or filtering out the stop words. FIG. 5 shows a schematic view of capturing the keyword pattern from a target window T and a candidate window C, according to an exemplary embodiment. In the exemplar of FIG. 5, according to the word weight of each word and whether the word is a stop word, the keyword pattern of the target window T is retrieved by filtering out the word "Brother", the word "I", and the word "am" from the target window T. The keyword pattern of the candidate window C is retrieved, based on the word weight of each word and if is a stop word, by filtering out the "I", the word "am", the word "to", and the word "me" from the candidate window C.

The POS pattern may be captured by according to each word of the target window T and the candidate window C and performing part of speech labeling and part of speech filtering, and retaining the POS with two kinds of part of speech, i.e. noun and verb. A common method of part of speech labeling may be such as the Hidden Markov Model (HMM) algorithm, and is not described here. Part of speech filtering may use such as the regular expression to perform filtering, and only retains words of nouns and verbs. An exemplar is described below. The post of target window T: Brother Ann I am Wei 34 d/6 k compensated dating please contact 0910220021. The captured POS pattern is nnn cc nn cd fw sym cd fw vv cd, where n or nn represents nouns, cc represents coordinating conjunction, cd represents cardinal number, fw represents foreign word, v represents verb, and sym represents symbol.

Figure 6:
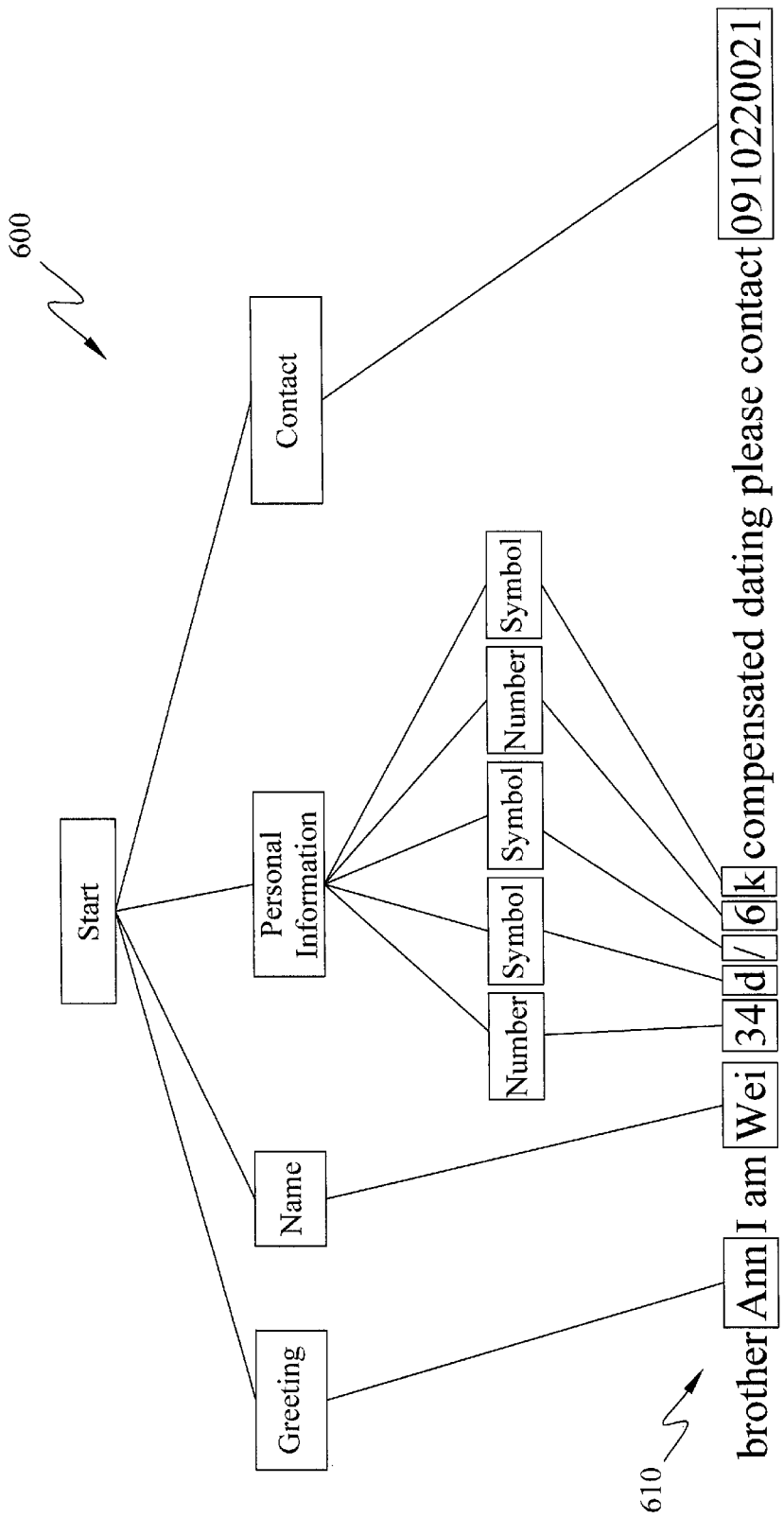
FIG. 6 shows a schematic view of using a conceptual parsing with a probabilistic context free grammar, according to an exemplary embodiment.

Capturing the concept pattern may use parsing of probabilistic context free grammar, to establish the concept pattern, and use this model to mark the concept of input sentences. FIG. 6 shows a schematic view of using a conceptual parsing with a probabilistic context free grammar, according to an exemplary embodiment. In an exemplary grammar tree 600 of FIG. 6, the grammar tree 600 may have a plurality of concept fields, such as greeting, name, personal information, and contact, etc., and the grammar tree 600 may be used to mark the concept of the input sentences.

In the exemplar of FIG. 6, a plurality of concept fields of the grammar tree 600 are used to parse the post of the target window T: Brother Ann I am the Wei 34 d/6 k compensated dating please contact 0910220021, such as the reference 610 shown. Therefore, "Ann" is marked as the greeting concept, "Wei" is marked as the name concept, "34 d/6 k" is marked as the personal information concept, "0910220021" is marked as the contact concept, and in the personal information concept "34d/6 k", "34" and "6" are the number concept, "d","/", and "K" are the symbol concept. Therefore, for the target window T, the captured concept pattern is: greeting, name, personal information, contact. Similarly, the plurality of concept fields of grammar tree 600 are used to parse the post of the candidate window C: Hello my am lovely nini student part-time eat fish come to http://www.wretch.cc/blog/a1984nini leave message to me. The captured concept pattern is: greeting, name, personal information, contact.

According to the exemplary embodiments of the present disclosure, for the two corresponding words of each word pair in the word pair table, a lexicon distance between these two words may also be calculated. For example, a similarity distance between the two words A and B may be calculated by the following Jaccard distance formula.

$$J_\delta(A, B) = 1 - J(A, B) = \frac{|A \cup B| - |A \cap B|}{|A \cup B|}.$$

The exemplary embodiments of the present disclosure may also integrate the lexicon distance and the aforementioned three features (patterns) distance, and calculate the similarity between two words according to the calculation formula of word similarity distance. The detailed is illustrated as the following formula.

$$Dist(wi, wj) =$$
$$w_{lex} \times Dist_{lex}(wi, wj) + w_{concept} \times Dist_{concept}(WindowT_{wi}, WindowC_{wj}) +$$
$$w_{pos} \times Dist_{pos}(WindowT_{wi}, WindowC_{wj}) +$$
$$w_{keyword} \times Dist_{keyword}(WindowT_{wi}, WindowC_{wj})$$
$$\text{where } w_{lex} + w_{concept} + w_{pos} + w_{word} = 1$$

In this formula, Dist (wi, wj) represents the distance between the two words wi and wj, $Dist_{lex}$ (wi, wj) represents the similarity distance between the two words wi and wj, $Dist_{concept}$ (wi, wj) represents the distance between the word wi in the target window T and the word wj in the candidate window C of the concept pattern, $Dist_{pos}$ (wi, wj) represents the distance between the word wi in the target window T and the word wj in the candidate window C of the speech pattern. $Dist_{keyword}$ (wi, wj) the distance between the word wi in the target window T and the word wj in the candidate window C of the key word pattern, and $W_{lex}$, $W_{concept}$, $W_{pos}$, and $W_{keyword}$ represent respectively the word weight, the concept weight, the part of speech weight, and the keyword weight.

Namely, the exemplary embodiments of the present disclosure may use a linear equation to integrate the lexical distance and the three features distances, and calculate the similarity between the two words based on the integrated distance.

The above obtained near-synonyms and at least one predefined monitored vocabulary set may not be synonymous, but with varying degrees of similarity. Therefore, in the operation of updating the near-synonyms to the language model in step 240, the disclosed exemplary embodiments may include calculating the weight of near-synonym, converting the original word weight to obtain the near-synonym weight, and using the near-synonym weight to recalculate the language models for the monitored vocabulary set and the near-synonyms. When the original word weight is known, the exemplary embodiments may calculate the similarity between the two words according to the preceding formula. In other words, when the original word weight is known, the exemplary embodiments may obtain the near-synonym weight through the conversion of the original word weight. The common conversion is such as a sigmoid function, i.e., $$P(t) = \frac{1}{1 + e^{-t}}$$

Figure 7:
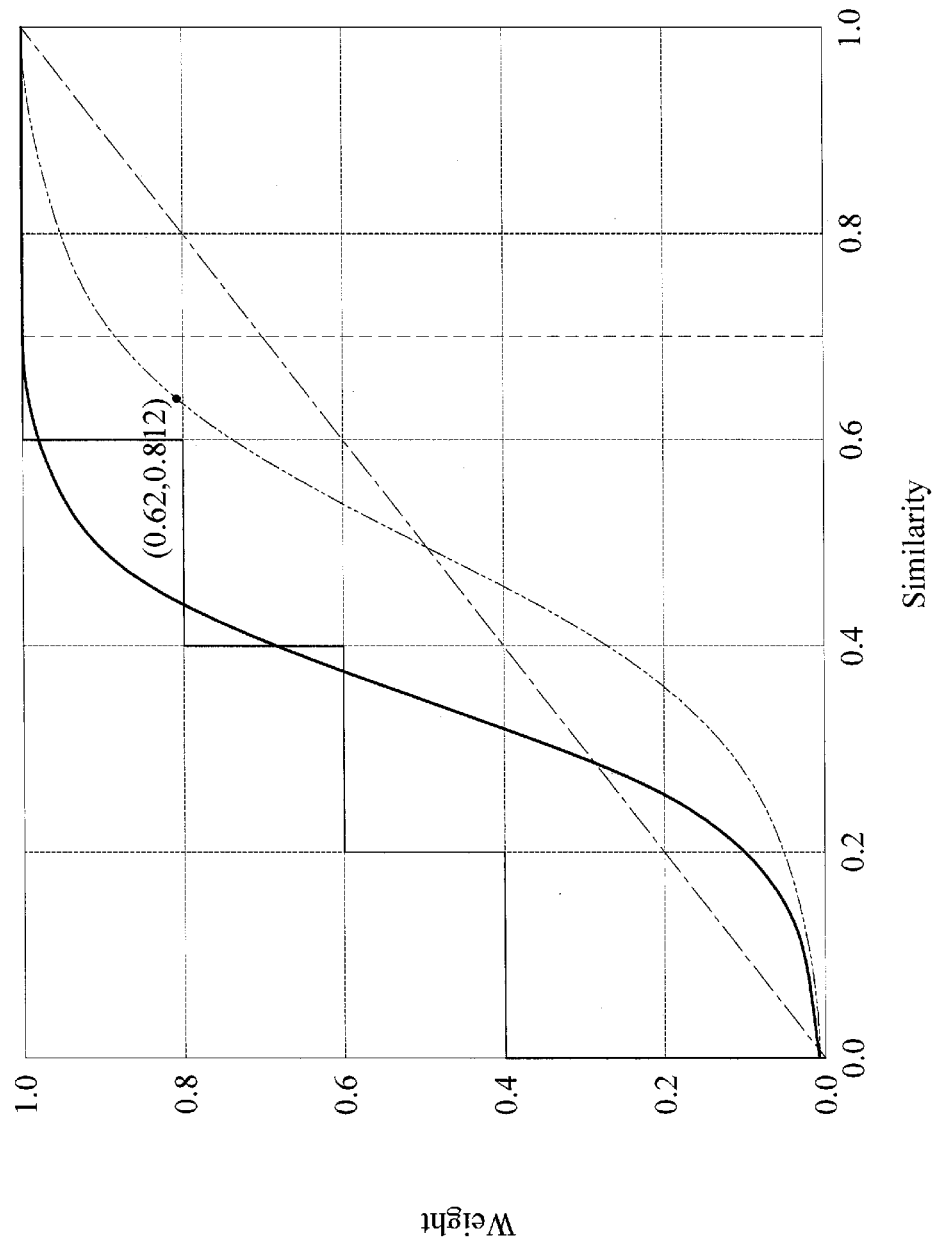
FIG. 7 shows a schematic view of calculating the weight of the near-synonym through a conversion of a sigmoid function, according to an exemplary embodiment.

FIG. 7 shows a schematic view of calculating the weight of the near-synonym through a conversion of a sigmoid function, according to an exemplary embodiment. As shown in FIG. 7, the references 711 to 714 respectively represent four sigmoid functions with different parameters, any value on the horizontal axis represents the similarity between the original monitored vocabulary and the near-synonym, any value on the vertical axis represents the near-synonym weight. When an exemplary embodiment of the present disclosure uses the conversion of the sigmoid function 712 to calculate the near-synonym weight, if the similarity between an original monitored vocabulary (e.g. compensated dating) with a near-synonym (e.g. eat fish) is 0.62, then through the conversion of the sigmoid function 712, it may obtain that the near-synonym weight is 0.812, as the value on the vertical axis at the location of the point (0.62, 0.812) on the sigmoid function 712.

After obtains the near-synonym weight, the near-synonym weight is used to re-calculate the language model of the near-synonym. According to an exemplary embodiment, the recalculation of the language model of the near-synonym may use the summation of probabilities with the same meaning of near-synonyms, then the summation is multiplied by the near-synonym weight. The detailed is illustrated as the following formula:

$$\hat{P}(w_i \mid w_{i-(n-1)}, \ldots, w_{i-1}) =$$
$$\sum_{j=1, w_{i,j} \in near\text{-}synonyms}^{m} weight_{w_{i,j}} \times \frac{count(w_{i(n-1)}, \ldots, w_{i-1}, w_{i,j})}{count(w_{i-(n-1)}, \ldots, w_{i-1})}$$

For example, the weight of near-synonym "eat fish" corresponding to the original monitored vocabulary "compensated dating" is equal to 0.812, and according to the above formula, the language model for the near-synonym "eat fish" may be calculated as follows:

$$\hat{P}(\text{eat fish} \mid w_{i-(n-1)}, \ldots, w_{i-1}) = weight_{eat\ fish, compensate\ dating} \times$$

$$\frac{\text{count}(w_{i-(n-1)}, \ldots, w_{i-1}, \text{compensated dating})}{\text{count}(w_{i-(n-1)}, \ldots, w_{i-1})} + \ldots +$$

$$weight_{eat\ fish, eat\ fish} \times \frac{\text{count}(w_{i-(n-1)}, \ldots, w_{i-1}, \text{eat fish})}{\text{count}(w_{i-(n-1)}, \ldots, w_{i-1})} =$$

$$0.812 \times \frac{\text{count}(w_{i-(n-1)}, \ldots, w_{i-1}, \text{compensate dating})}{\text{count}(w_{i-(n-1)}, \ldots, w_{i-1})} +$$

$$\ldots + 1 \times \frac{\text{count}(w_{i-(n-1)}, \ldots, w_{i-1}, \text{eat fish})}{\text{count}(w_{i-(n-1)}, \ldots, w_{i-1})}$$

Accordingly, the exemplary embodiments of the present disclosure may obtain the weight of each near-synonym of a plurality of near-synonyms through the conversion of the weight of each word in at least one monitored vocabulary set, and update or rebuild the plurality of near-synonyms into a plurality of language models for the (i+1)-th group of accounts.

As described before, the exemplary embodiments of the present disclosure may update the plurality of near-synonyms into the existed language model, and for each new account of the k-th group of accounts different from the k−1-th group of accounts, rebuild a language model for this new account. After the language model of each account is established, similarity of language model of the account may be calculated. Then through a clustering algorithm, such as an incremental clustering algorithm, the accounts with similar features (high similarity) are integrated into a group; When the similarity of a group exceeds a threshold value, it is determined that the accounts in this group are the same account. When the similarity of the language model of a new account is below a threshold value and is unable to be classified into any group, then the account belongs to a new group. In other words, the exemplary embodiments of the present disclosure may use an incremental clustering algorithm, to re-cluster the counts according to a new language model, and discover a new group of accounts.

For example, the account 1, the account 2, and the account 5 are the same account group A; the account 11, the account number 13, and the account 22 are the same account group B; the similarity between a new account 77 and group A is higher than a threshold value, so the new account 77 belongs to the group A; The similarity between a new account 33 and the group A is lower than the threshold value, and the similarity with group B is also lower than the threshold value such that the new account 33 is unable to belong to any group, thus results in a new group.

Figure 8:
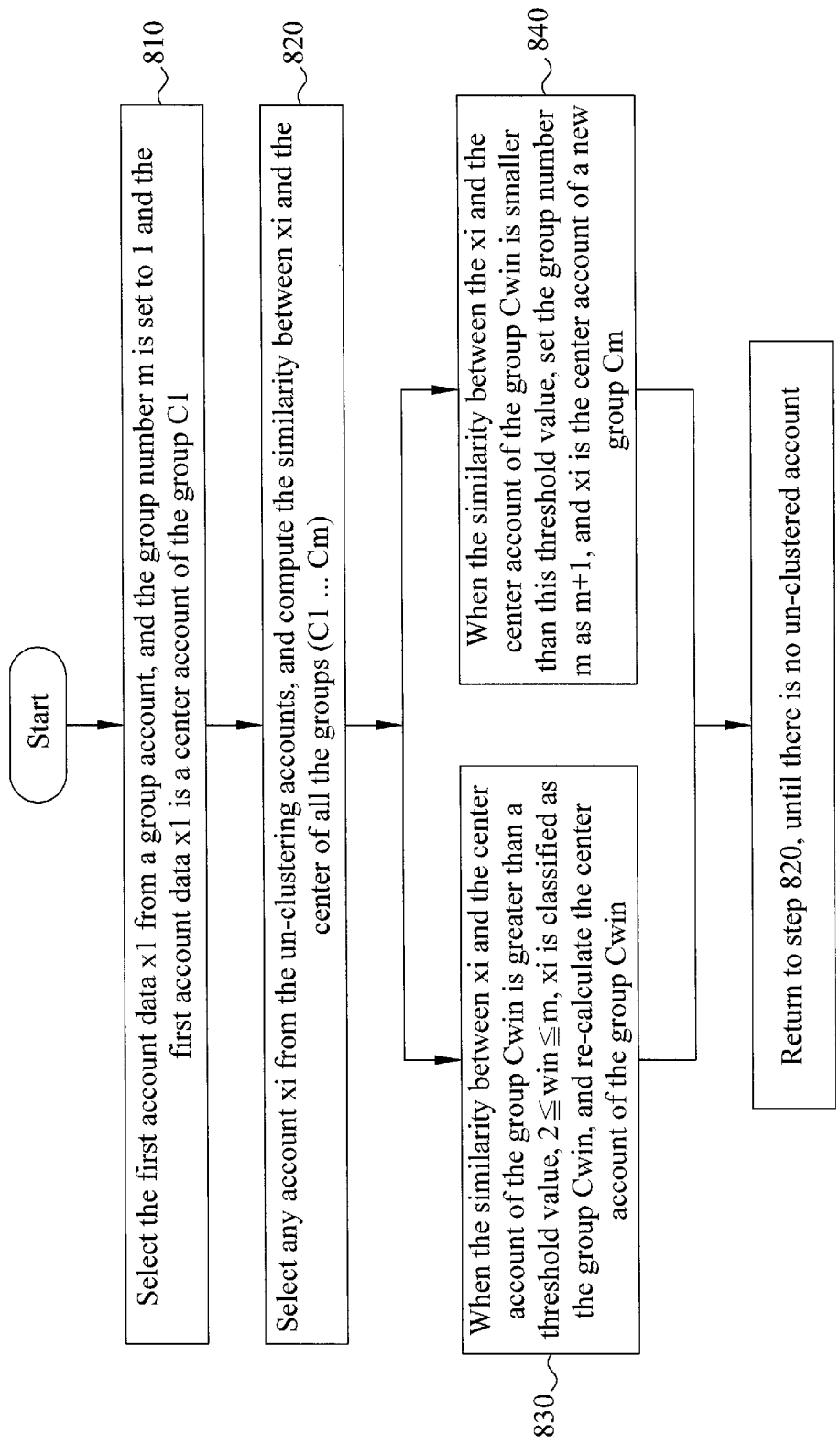
FIG. 8 shows an operation flow illustrating an incremental clustering algorithm, according to an exemplary embodiment.

FIG. 8 shows an operation flow illustrating an incremental clustering algorithm, according to an exemplary embodiment. Refer to FIG. 8, in step 810, the algorithm selects the first account data x1 from a group account, and the group number m is set to 1 and the first account data x1 is a center account of the group C1. In step 820, the algorithm selects any account xi from the un-clustering accounts, and computes the similarity between xi and the center of all the groups (C1 . . . Cm). In step 830, when the similarity between xi and the center account of the group Cwin is greater than a threshold value, 2≤win≤m, xi is classified as the group Cwin, and re-calculates the center account of the group Cwin. The algorithm returns to step 820 until there is no un-clustered account. In step 840, when the similarity between the xi and the center account of the group Cwin is smaller than this threshold value, the algorithm sets the group number m as m+1, and xi is the center account of a new group Cm. The algorithm returns to step 820, until there is no un-clustered account.

Figure 9:
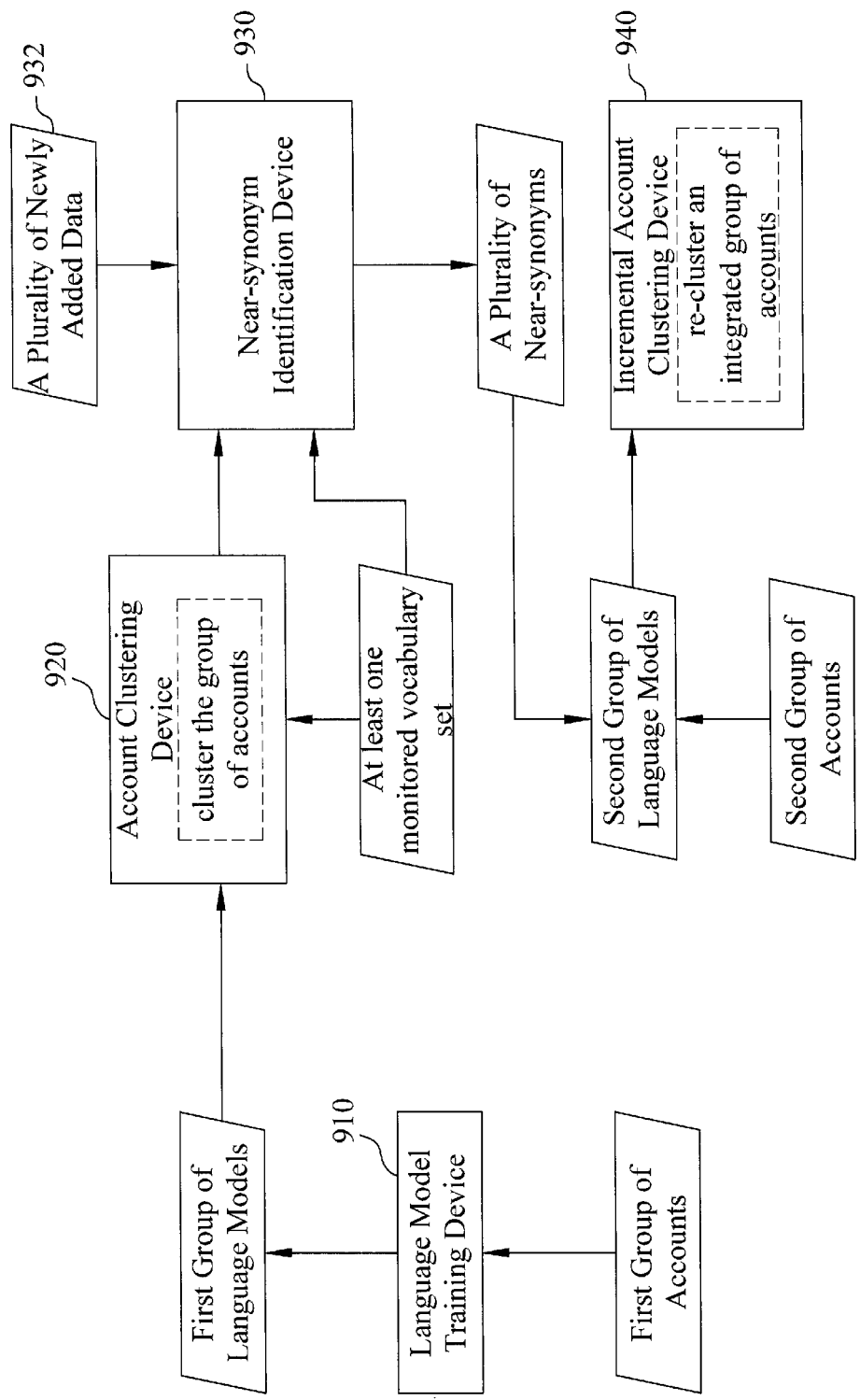
FIG. 9 shows a system for discovering suspicious group of accounts, according to an exemplary embodiment.

Accordingly, FIG. 9 shows a system for discovering suspicious group of accounts, according to an exemplary embodiment. Refer to FIG. 9, a system for discovering suspicious account groups 900 may comprise a language model training device 910, an account clustering device 920, a near-synonym identification device 930, and an incremental account clustering device 940. The language model training device 910 establishes a language model according to the post contents from each account of a first group of accounts during a first time interval, to describe the linguistic fashion of the account. The account clustering device 920 compares the similarity among a first group of language models of the first group of accounts to cluster the first group of accounts. The near-synonym identification device 930 discovers a plurality of near-synonyms of at least one monitored vocabulary set for a plurality of newly added data 932 during a second time interval, and updates the plurality of near-synonyms to a second group of language models of a second group of accounts. The incremental account clustering device 940 integrates the first and the second groups of accounts, and re-clusters an integrated group of accounts.

According to the exemplary embodiments of the present disclosure, the system 900 may further include a word pair table, each word pair of the word pair table contains a monitored vocabulary of at least one monitored vocabulary set, and a candidate near-synonym of this monitored vocabulary. The near-synonym identification device 930 updates the plurality of near-synonyms into an existed language model during each time interval, and re-establishes a language model for each new account, to describe post contents of this new account. The near-synonym identification device 930 also captures one or more features through previous and next feature windows of each monitored vocabulary of the at least one monitored vocabulary set, to determine if one or more words of the new added monitored vocabulary belong to the near-synonym of the monitored vocabulary. For a monitored vocabulary and a candidate near-synonym of each pair in the word pair table, the changed identification device 930 also fetches partial words from a corresponding post, respectively, and saves the partial words respectively corresponding to the monitored vocabulary and the candidate near-synonym as a target window and a candidate window, respectively. The near-synonym identification device 930 may also capture one or more aforementioned features from the target window and the candidate window.

In summary, the disclosed exemplary embodiments provide a method and system for automatically discovering the suspicious account groups. The technology is a language model adaptation technique with near-synonym expansion, which is able to analyze the similarity of the linguistic fashion of post contents of the accounts to discover suspicious account groups with high homogeneity of the linguistic fashion. After discovers the suspicious accounts, this technique may combine with existing communication analysis techniques, to identify the interaction connection among these accounts.

It will be apparent to those skilled in the art that various near-synonyms can be made to the disclosed embodiments. It is intended that the specification and examples be considered as exemplary only, with a true scope of the disclosure being indicated by the following claims and their equivalents.

What is claimed is:

1. A method for discovering suspicious account groups, comprising:
under a control of at least one hardware processor,
receiving a monitoring website table and at least one monitored vocabulary set containing a plurality of elements;
downloading a first group of accounts and one or more post contents corresponding to each account of the first group of accounts from the monitoring website during a first time interval;
establishing a language model, for each account of the first group of accounts, according to the one or more post contents from each account of the first group of accounts during the first time interval, to describe a linguistic fashion for each account, the language model being expressed at least partly as a probability of an occurrence of at least one element of the at least one monitored vocabulary set in an account;
comparing a similarity among a first group of language models of the first group of accounts to cluster the first group of accounts;
downloading newly added data including a second group of accounts and one or more post contents corresponding to each account of the second group of accounts from the monitoring website during a second time interval;
obtaining one or more homonyms synonyms in the newly added data of at least one element of the at least one monitored vocabulary set corresponding to the first group of accounts, comprising the sub-steps of
fetching one or more features through a previous feature window and a next feature window of each monitored vocabulary in the at least one monitored vocabulary set; and
converting a weight of an original word of the at least one monitored vocabulary set into a corresponding weight of a homonym synonym;
updating the first group of language models with the one or more homonyms synonyms;
integrating the first and the second groups of accounts to create an integrated group of accounts;
rebuilding a language model for each of the integrated group of accounts to create a second group of language models based on the step of updating the first group of language models with the one or more homonyms synonyms;
clustering the integrated group of accounts according to the determined similarity among the integrated group of accounts based on the second group of language models;
determining at least one suspicious account group after the step of clustering according to a level of homogeneity among at least account groups of the integrated group of accounts; and
determining interaction connection among accounts of the integrated group of accounts based on a result of the step of identifying at least one suspicious account group.

2. The method as claimed in claim 1, said method further includes: continuously determining at least one suspicious account group by downloading newly added data during a plurality of updated time intervals.

3. The method as claimed in claim 2, said method further includes: for said each updated time interval, updating said plurality of homonyms synonyms to at least one existing language model, and for each new account different from the previous group of accounts during said each update time interval, re-establishing a language model of said new account to describe its post contents.

4. The method as claimed in claim 1, wherein the discovering the one or more homonyms synonyms of the at least a monitored vocabulary set is through the previous and the next feature windows of each monitored vocabulary of said at least a monitored vocabulary set to capture at least one feature, to determine whether one or more new words of the plurality of new added data belong to at least one homonym synonym of said monitored vocabulary.

5. The method as claimed in claim 4, wherein said at least one feature is one or more features chosen from a group of features consisting of a keyword pattern, a part of speech pattern, a concept pattern, and a word string similarity.

6. The method as claimed in claim 1, wherein establishing said language model of said account further includes: training said language model by performing a word segmentation processing and a feature capturing of a linguistic fashion on a post contents corresponding to said account.

7. The method as claimed in claim 1, said method further includes: establishing a word pair table, wherein each word pair of said word pair table includes a first word and a second word, said first word is a monitored vocabulary of said at least one monitored vocabulary set, and said second word is a candidate homonym synonym.

8. The method as claimed in claim 7, said method further includes: establishing a target window and a candidate window of said word pair, and capturing one or more features from said target window and said candidate window; and integrating a word distance between said first word and said second word and one or more distances of said one or more different features to calculate the similarity of said first word and said second word according to an integrated distance.

9. The method as claimed in claim 1, said method further includes: converting a first weight of each word of said at least a monitored vocabulary set to obtain a second weight of each homonym synonym of the one or more homonyms synonyms to update the one or more homonyms synonyms to said second group of language models of said second group of accounts.

10. The method as claimed in claim 1, said method further includes: according to said second group of language models of said second group of accounts, re-clustering said integrated group of accounts by an increment clustering algorithm, to discover one or more new group of accounts.

11. A system for discovering suspicious account groups, comprising:
a language model training device receiving a monitoring website table and at least one monitored vocabulary set containing a plurality of elements, receiving a first group of accounts and one or more post contents corresponding to each account of the first group of accounts downloaded from the monitoring website during a first time interval, and establishing a language model, for each account of the first group of accounts, according to the one or more post contents from each account of the first group of accounts during the first time interval, to describe a linguistic fashion for each account, the language model being expressed at least partly as a probability of an occurrence of at least one element of the at least one monitored vocabulary set in an account, the language model training device further receiving newly added data including a second group of accounts and one or more post contents corresponding to each account of the second group of accounts downloaded from the monitoring website during a second time interval;

an account clustering device clustering the first group of accounts according to a similarity of a first group of language models of the first group of accounts;

a near-synonym identification device discovering one or more near-synonyms of at least one element of the at least one monitored vocabulary set in the newly added data during a second time interval, and updating the one or more near-synonyms to a second group of language models of a second group of accounts; and an incremental account clustering device updating the first group of language models with the one or more homonyms synonyms, integrating the first and the second groups of accounts to create an integrated group of accounts, rebuilding a language model for each of the integrated group of accounts to create a second group of language models based on the step of updating the first group of language models with the one or more homonyms synonyms and re-clustering the integrated group of accounts according to the determined similarity among the integrated group of accounts based on the second group of language models;

wherein to discover the one or more synonyms in the newly added data the system is configured to fetch one or more features through a previous feature window and a next feature window of each monitored vocabulary in the at least one monitored vocabulary set; and convert a weight of an original word of the at least one monitored vocabulary set into a corresponding weight of a homonym synonym; and wherein the system is further configured to determine at least one suspicious account group after the step of clustering according to a level of homogeneity among at least account groups of the integrated group of accounts, and determine interaction connection among accounts of the integrated group of accounts based on a result of the step of identifying at least one suspicious account group.

12. The system as claimed in claim 11, wherein for each updated time interval of a plurality of updated time intervals, said homonym synonym identification device updates said one or more homonyms synonyms on at least one existing language model, and for each new account of at least one new account different from a previous group of accounts during the each updated time interval, re-establishes a language model of said new account to describe its post contents.

13. The system as claimed in claim 11, wherein said homonym synonym identification device captures at least one feature from the previous and the next feature windows of each monitored vocabulary of said at least a monitored vocabulary set, to determine whether one or more new words of the plurality of new added data belong to at least one homonym synonym of said monitored vocabulary.

14. The system as claimed in claim 13, wherein said at least one feature is one or more features chosen from a group of features consisting of a keyword pattern, a part of speech pattern, a concept pattern, and a word string similarity.

15. The system as claimed in claim 11, said system further includes:

a word pair table, wherein each word pair in said word pair table includes a monitored vocabulary in said at least one monitored vocabulary set, and a candidate homonym synonym of said monitored vocabulary.

16. The system as claimed in claim 15, wherein for the monitored vocabulary and a candidate homonym synonym of each pair in the word pair table, said homonym synonym identification device fetches one or more partial words from a corresponding post respectively, and saves the one or more partial words respectively corresponding to the monitored vocabulary and the candidate homonym synonym as a target window and a candidate window, respectively.

17. The system as claimed in claim 16, wherein said homonym synonym identification device fetches one or more features from said target window and said candidate window.

* * * * *